US012128738B2

(12) United States Patent
Bharadwaj

(10) Patent No.: US 12,128,738 B2
(45) Date of Patent: Oct. 29, 2024

(54) CABIN AIR EXTRACTION ASSEMBLY AND METHOD FOR A VEHICLE

(71) Applicant: Rivian IP Holdings, LLC, Plymouth, MI (US)

(72) Inventor: Sachin Suryanarayana Bharadwaj, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 81 days.

(21) Appl. No.: 17/683,892

(22) Filed: Mar. 1, 2022

(65) Prior Publication Data

US 2023/0278397 A1 Sep. 7, 2023

(51) Int. Cl.
*B60H 1/24* (2006.01)
*B60R 11/02* (2006.01)

(52) U.S. Cl.
CPC .............. *B60H 1/249* (2013.01); *B60H 1/243* (2013.01); *B60R 11/0217* (2013.01)

(58) Field of Classification Search
CPC ................................ B60H 1/243; B60H 1/249
USPC .......................................................... 454/162
See application file for complete search history.

(56) References Cited

U.S. PATENT DOCUMENTS

| 4,691,623 | A | * | 9/1987 | Mizusawa | .............. F16K 15/147 137/846 |
| 2015/0066339 | A1 | * | 3/2015 | Hoare | .................... B60W 50/14 701/116 |
| 2020/0162809 | A1 | * | 5/2020 | Honji | ..................... B60J 5/0463 |
| 2020/0307357 | A1 | * | 10/2020 | Nguyen | .................... B60H 1/26 |

FOREIGN PATENT DOCUMENTS

| DE | 19509355 A1 * | 9/1996 | ............. B60H 1/249 |
| EP | 365395 B1 * | 8/1992 | ............. B60H 1/248 |

* cited by examiner

*Primary Examiner* — Allen R. B. Schult
(74) *Attorney, Agent, or Firm* — Foley & Lardner LLP

(57) ABSTRACT

A cabin air extraction assembly for a vehicle that utilizes an air extractor input port disposed in the rear portion of the cabin of a vehicle that conduits cabin air to a snorkel assembly disposed within a sealed or substantially sealed body panel or side structure near the rear wheel well of the vehicle, for example. This snorkel assembly includes a one-way pressure relief valve. Because the snorkel assembly is positioned such that it is not prone to obstruction or the intake of water in a wading application, there is no risk of water intrusion into the cabin of the vehicle, even if the bottom portion of the snorkel assembly is disposed below the wading line during vehicle operation. Thus, the cabin air extraction assembly and associated method promote passenger comfort by allowing the HVAC system of a vehicle to be operated using fresh, outside air without cabin pressure problems, even during a wading application.

16 Claims, 14 Drawing Sheets

CABIN AIR EXTRACTION ASSEMBLY AND METHOD FOR A VEHICLE

INTRODUCTION

The present disclosure relates generally to the automotive field. More particularly, the present disclosure relates to a cabin air extraction assembly and method for a vehicle.

Many modern vehicles have tightly sealed cabins to improve occupant environmental comfort, decrease exterior noise intrusion, and enhance perceived vehicle quality. Some of these vehicles utilize air extractors or similar setups that exhaust excess cabin pressure when a door or window is closed, for example, such that the closing of a window or door does not cause a perceivable pressure pulse within the tightly sealed cabin, potentially causing passenger discomfort. An undesirable cabin pressure increase can also result from operating an HVAC system that forces fresh, outside air into the tightly sealed cabin. In general, air extractors are designed to exhaust excess cabin pressure, while not allowing outside air or noise to enter the cabin through the air extractor. Thus, most air extractors utilize one-way pressure relief valves or similar setups. Often, the air extractors utilize simple channels that pass through the body of the vehicle, from interior to exterior, with the pressure relief valve or an associated vent cover being undesirably visible on the exterior of the vehicle or otherwise positioned where it may be subject to obstruction. In some cases, the pressure relief valve or associated vent cover is positioned low on the vehicle body, hiding it aesthetically to some extent. Both operability and vehicle aesthetics are legitimate concerns for vehicle manufacturers.

A special challenge is presented in the case of a sport utility or adventure vehicle that is, in part, designed to wade in water, at least to the top of the wheel wells, for example. In such cases, a low air extractor position is not desirable, nor is any air extractor position that allows for the possible intrusion of water into the tightly sealed cabin.

The statements made in this introduction merely provide background information related to the present disclosure and may not constitute prior art. This introduction is intended to provide illustrative context only, and should not be construed as being limiting in any manner. It will be readily apparent to those of ordinary skill in the art that the principles and concepts of the present disclosure may be applied in other contexts equally, without departing from the spirit or scope of the present disclosure.

BRIEF SUMMARY

The present disclosure provides a cabin air extraction assembly and method for a vehicle that utilize an air extractor input port disposed in the rear portion of the cabin of a vehicle that conduits cabin air to a snorkel assembly disposed within a sealed or substantially sealed body panel or side structure near the rear wheel well of the vehicle, for example. This body panel or side structure is sealed from the outside environment and may include any true side structure, a front structure, a back structure, a tailgate structure, a hatch structure, and/or the like of the vehicle, without limitation. This snorkel assembly includes a one-way pressure relief valve and employs a snorkel concept similar to that employed in sport utility and adventure vehicles for internal combustion engine intake air. From the snorkel assembly, the cabin air is vented to the environment surrounding the vehicle, either directly or indirectly. Because the snorkel assembly positioned such that it is not prone to obstruction or the intake of water in a wading application, there is no risk of water intrusion into the cabin of the vehicle, even if the bottom portion of the snorkel assembly is disposed below the wading line during vehicle operation. The air extraction assembly is thus not visible on the exterior of the vehicle and the air extractor input port can be hidden under an interior grate cover and/or around the periphery of a speaker or other interior structure disposed in the rear portion of the cabin of the vehicle. In this latter case, cabin air is conduited from the air extractor input port, around a sound absorber structure disposed within the body panel or side structure of the vehicle, and to the pressure relief valve of the snorkel assembly, which is disposed above the wading line of the vehicle within the body panel or side structure, via one or more paths created within the body panel or side structure of the vehicle around the sound absorber structure. Thus, the cabin air extraction assembly and method of the present disclosure promote passenger comfort by allowing the HVAC system of a vehicle to be operated using fresh, outside air without cabin pressure problems, even during a wading application, without rolling down the windows, for example, to maintain cabin pressure.

In one illustrative embodiment, the present disclosure provides an air extraction snorkel assembly for a vehicle, the air extraction snorkel assembly including: a snorkel housing defining an interior chamber, wherein the snorkel housing is adapted to selectively contain air conduited from a cabin of the vehicle; and a pressure relief valve assembly disposed through a wall structure of the snorkel housing, wherein the pressure relief valve assembly is adapted to selectively allow air to enter the interior chamber defined by the snorkel housing but not exit the interior chamber defined by the snorkel housing. The air extraction snorkel assembly further includes a bezel structure coupled to an exterior surface of the snorkel housing and disposed around the pressure relief valve assembly, wherein the bezel structure is adapted to provide a smooth transition of local air flow through the pressure relief valve assembly and into the interior chamber defined by the snorkel housing. The snorkel housing is adapted to be disposed within a sealed or substantially sealed side structure of the vehicle. The pressure relief valve assembly is adapted to be disposed within the sealed or substantially sealed side structure of the vehicle above a wading line of the vehicle. A bottom portion of the snorkel housing defining an opening to an environment surrounding the vehicle is adapted to be disposed within the sealed or substantially sealed side structure of the vehicle below the wading line of the vehicle. Optionally, the air extraction snorkel assembly further includes an external gasket disposed around an opening formed in a lower portion of the snorkel housing, wherein the external gasket is adapted to sealingly engage a lower surface of the side structure of the vehicle through which a corresponding opening is formed, thereby allowing air to pass from the interior chamber defined by the snorkel housing, through the opening formed in the lower portion of the snorkel housing and the corresponding opening formed in the lower surface of the side structure, and into an unsealed wheel well area of the vehicle and an environment surrounding the vehicle. Thus, in general, air from the interior chamber defined by the snorkel housing is ultimately vented to an environment surrounding the vehicle above a wading line of the vehicle through the pressure relief valve assembly and the snorkel housing.

In another illustrative embodiment, the present disclosure provides an air extraction assembly for a vehicle, the air extraction system including: an interior structure defining an inlet port disposed in a cabin of the vehicle; a side structure that is sealed or substantially sealed, thereby preventing air and water from an outside environment from entering the cabin of the vehicle, wherein an interior portion of the side structure encompasses one or more air flow channels; and an air extraction snorkel assembly disposed within the side structure; wherein the one or more air flow channels encompassed within the side structure are adapted to conduit air from the cabin of the vehicle and the inlet port of the interior structure to the air extraction snorkel assembly. The air extraction snorkel assembly includes: a snorkel housing defining an interior chamber, wherein the snorkel housing is adapted to selectively contain the air conduited from the cabin of the vehicle and the inlet port of the interior structure; and a pressure relief valve assembly disposed through a wall structure of the snorkel housing, wherein the pressure relief valve assembly is adapted to selectively allow air to enter the interior chamber defined by the snorkel housing but not exit the interior chamber defined by the snorkel housing. The air extraction snorkel assembly further includes a bezel structure coupled to an exterior surface of the snorkel housing and disposed around the pressure relief valve assembly, wherein the bezel structure is adapted to provide a smooth transition of local air flow through the pressure relief valve assembly and into the interior chamber defined by the snorkel housing. Optionally, the air extraction snorkel assembly further includes an external gasket disposed around an opening formed in a lower portion of the snorkel housing, wherein the external gasket is adapted to sealingly engage a lower surface of the side structure of the vehicle through which a corresponding opening is formed, thereby allowing air to pass from the interior chamber defined by the snorkel housing, through the opening formed in the lower portion of the snorkel housing and the corresponding opening formed in the lower surface of the side structure, and into an unsealed wheel well area of the vehicle and an environment surrounding the vehicle. The pressure relief valve assembly is disposed within the side structure above a wading line of the vehicle. A bottom portion of the snorkel housing defining an opening to an environment surrounding the vehicle is disposed within the side structure below the wading line of the vehicle. Thus, in general, air from the interior chamber defined by the snorkel housing is ultimately vented to an environment surrounding the vehicle above a wading line of the vehicle through the pressure relief valve assembly and the snorkel housing.

In one illustrative embodiment of the air extraction assembly, the inlet port defined by the interior structure is disposed adjacent to a speaker assembly and behind a speaker grill of the vehicle. In this illustrative embodiment, the one or more air flow channels encompassed within the side structure are adapted to conduit air from the cabin of the vehicle and the inlet port of the interior structure to the air extraction snorkel assembly around a sound absorber structure disposed between the interior structure and the side structure adjacent to the speaker assembly of the vehicle. Here, the interior structure and the side structure are disposed at a rear portion of the vehicle. Other grills, vents, and interior structures can be used to hide the inlet port defined by the interior structure equally.

In a further illustrative embodiment, the present disclosure provides an air extraction method for use in a vehicle, the air extraction method including: receiving cabin air from a cabin of the vehicle through an interior structure defining an inlet port disposed in the cabin of the vehicle; conduiting the cabin air received through the inlet port through one or more air flow channels encompassed within an interior portion of a side structure of the vehicle, wherein the side structure is sealed or substantially sealed, thereby preventing air and water from an outside environment from entering the cabin of the vehicle; and providing the cabin air to an air extraction snorkel assembly disposed within the side structure. The air extraction snorkel assembly includes: a snorkel housing defining an interior chamber, wherein the snorkel housing is adapted to selectively contain the air conduited from the cabin of the vehicle and the inlet port of the interior structure; and a pressure relief valve assembly disposed through a wall structure of the snorkel housing, wherein the pressure relief valve assembly is adapted to selectively allow air to enter the interior chamber defined by the snorkel housing but not exit the interior chamber defined by the snorkel housing. The pressure relief valve assembly is disposed within the side structure above a wading line of the vehicle, and a bottom portion of the snorkel housing defining an opening to an environment surrounding the vehicle is disposed within the side structure below the wading line of the vehicle.

In one illustrative embodiment of the air extraction method, the inlet port defined by the interior structure is disposed adjacent to a speaker assembly and behind a speaker grill of the vehicle. In this illustrative embodiment, the one or more air flow channels encompassed within the side structure are adapted to conduit air from the cabin of the vehicle and the inlet port of the interior structure to the air extraction snorkel assembly around a sound absorber structure disposed between the interior structure and the side structure adjacent to the speaker assembly of the vehicle. Here, the interior structure and the side structure are disposed at a rear portion of the vehicle. Other grills, vents, and interior structures can be used to hide the inlet port defined by the interior structure equally.

The foregoing brief summary is illustrative only and is not intended to be limiting in any manner. In addition to the illustrative aspects, embodiments, and features described above, further alternative and optional aspects, embodiments, and features will become apparent to those of ordinary skill in the art by reference to the drawings and the following detailed description.

BRIEF DESCRIPTION OF THE DRAWINGS

The present disclosure is illustrated and described with reference to the following drawings, in which like reference numbers are used to denote like assembly components/method steps, as appropriate, and in which.

DETAILED DESCRIPTION

The present disclosure provides a cabin air extraction assembly and method for a vehicle that utilize an air extractor input port disposed in the rear portion of the cabin of a vehicle that conduits cabin air to a snorkel assembly disposed within a sealed or substantially sealed body panel or side structure near the rear wheel well of the vehicle, for example. This snorkel assembly includes a one-way pressure relief valve and employs a snorkel concept similar to that employed in sport utility and adventure vehicles for internal combustion engine intake air. From the snorkel assembly, the cabin air is vented to the environment surrounding the vehicle, either directly or indirectly. Because the snorkel assembly positioned such that it is not prone to obstruction or the intake of water in a wading application, there is no risk of water intrusion into the cabin of the vehicle, even if the bottom portion of the snorkel assembly is disposed below the wading line during vehicle operation. The air extraction assembly is thus not visible on the exterior of the vehicle and the air extractor input port can be hidden under an interior grate cover and/or around the periphery of a speaker or the like disposed in the rear portion of the cabin of the vehicle. In this latter case, cabin air is conduited from the air extractor input port, around a sound absorber structure disposed within the body panel or side structure of the vehicle, and to the pressure relief valve of the snorkel assembly, which is disposed above the wading line of the vehicle within the body panel or side structure, via one or more paths created within the body panel or side structure of the vehicle around the sound absorber structure. Thus, the cabin air extraction assembly and method of the present disclosure promote passenger comfort by allowing the HVAC system of a vehicle to be operated using fresh, outside air without cabin pressure problems, even during a wading application, without rolling down the windows, for example, to maintain cabin pressure.

Figure 1:
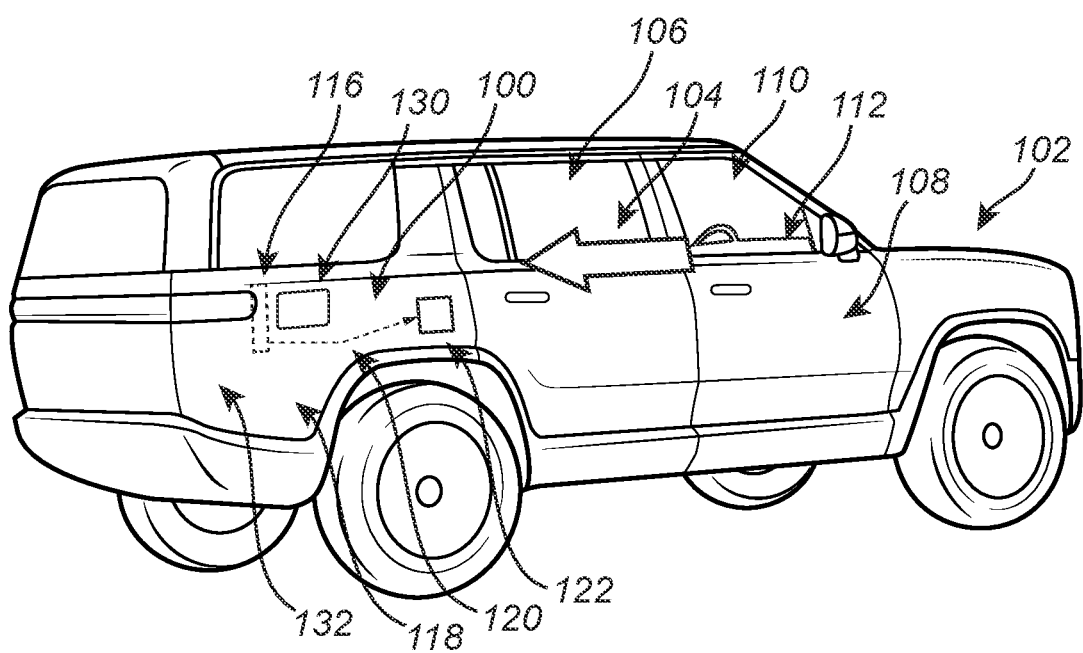
FIG. 1 is a schematic diagram illustrating the general positioning of the cabin air extraction assembly of the present disclosure with respect to the other structures of a vehicle.

FIG. 1 is a schematic diagram illustrating the general positioning of the cabin air extraction assembly 100 of the present disclosure with respect to the other structures of a vehicle 102. The cabin air extraction assembly 100 is adapted to selectively remove cabin air 104 from the cabin 106 of the vehicle 102 to alleviate any undesirable cabin over-pressurization or pressure pulses that are perceivable (or imperceivable) to a vehicle occupant, such as those caused by the closing of a door 108 or window 110 of the vehicle 102 or by operating the HVAC system 112 of the vehicle in a fresh (i.e., outside) air mode with the doors 108 and windows 110 closed and/or during a vehicle wading operation. Advantageously, the cabin air extraction assembly 100 is "invisible" and does not undesirably interrupt the interior or exterior aesthetic lines of the vehicle 102, meets all applicable air flow requirements, and avoids the unwanted intrusion of air or water from the outside environment into the interior of the vehicle 102, especially during a vehicle wading operation.

The cabin air extraction assembly 100 generally includes an interior structure 314 (FIG. 3) (such as an interior trim panel or the like) of the vehicle 102 defining an inlet port 116 disposed in the cabin 106 of the vehicle 102. A side structure 118 (such as an exterior body panel or the like) that is sealed or substantially sealed, thereby preventing air and water from an outside environment from entering the cabin 106 of the vehicle 102, is provided and has an interior portion or side that encompasses one or more air flow channels 120 that are fluidly coupled to the inlet port 116 of the interior structure 314. An air extraction snorkel assembly 122 is disposed within the side structure 118 and is fluidly coupled with the one or more air flow channels 120 encompassed within the side structure 118. Thus, the one or more air flow channels 120 encompassed within the side structure 118 are adapted to conduit air 104 from the cabin 106 of the vehicle 102 and the inlet port 116 of the interior structure 314 to the air extraction snorkel assembly 122.

Figure 3:
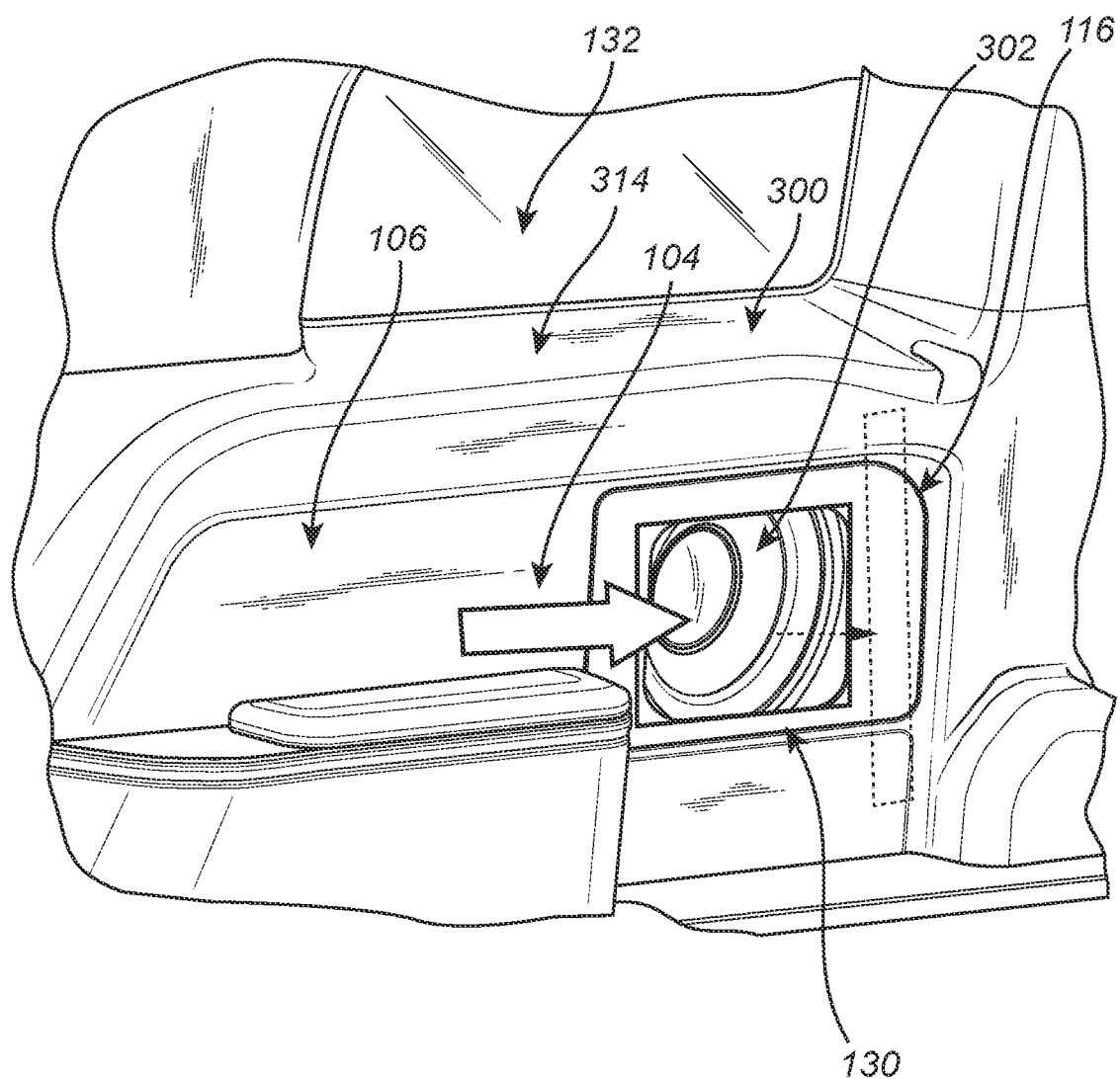
FIG. 3 is a perspective view illustrating one embodiment of the interior, inlet end of the cabin air extraction assembly of the present disclosure, utilizing a speaker assembly and associated speaker grill to hide the associated interior inlet port.
Figure 10:
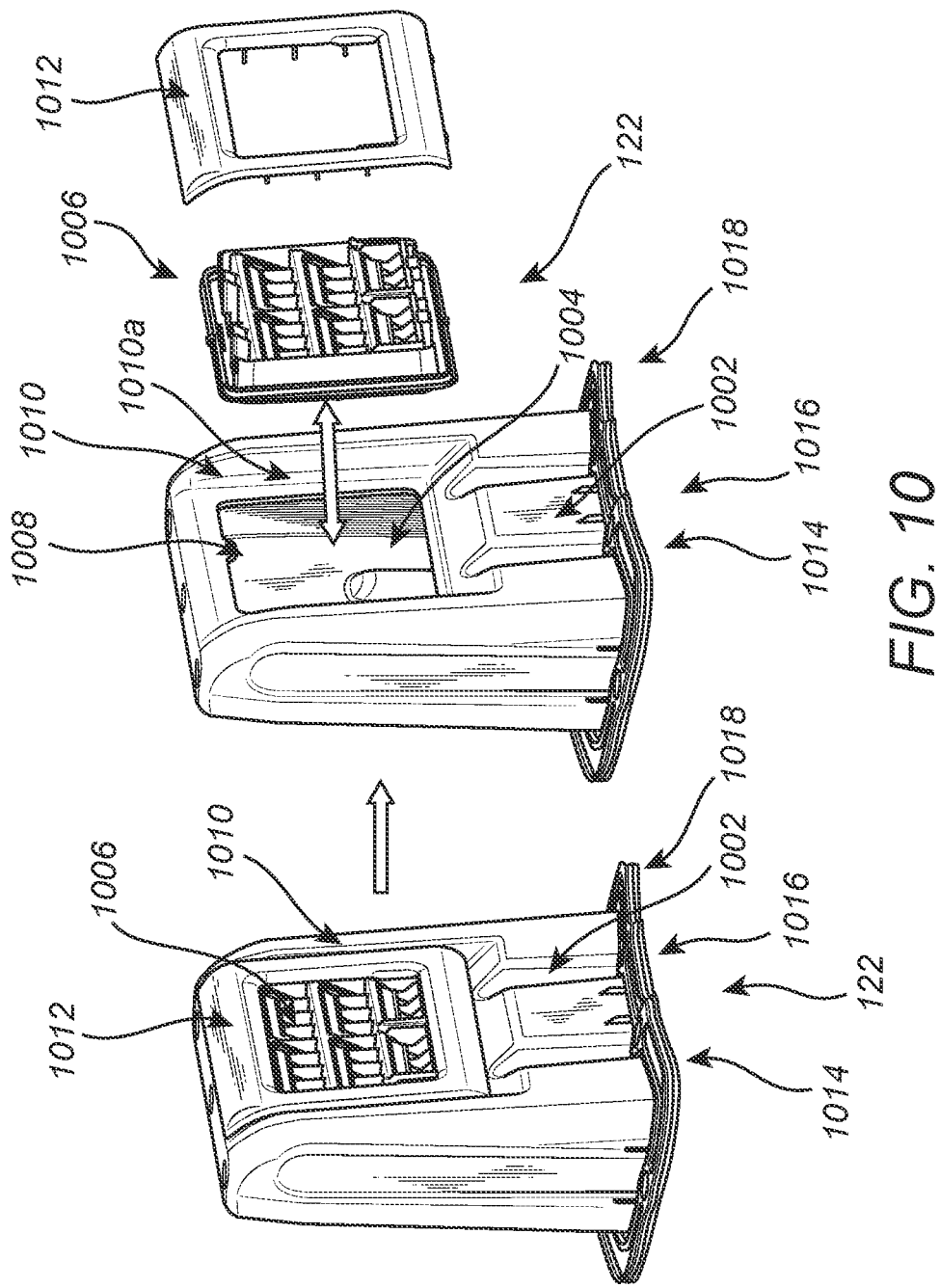
FIG. 10 is another perspective view of one illustrative embodiment of the snorkel assembly of the present disclosure, including an exploded view.

As is most clearly illustrated in FIG. 10 and described in greater detail herein below, the air extraction snorkel assembly 122 generally includes a snorkel housing 1002 defining an interior chamber 1004 that is adapted to selectively contain the air 104 (FIG. 1) conduited from the cabin 106 (FIG. 1) of the vehicle 102 (FIG. 1) and the inlet port 116 (FIG. 1) of the interior structure 314 (FIG. 3). The air extraction snorkel assembly 122 further includes a pressure relief valve assembly 1006 disposed through an opening 1008 in a wall structure 1010, such as a side wall structure or the like, of the snorkel housing 1002. The pressure relief valve assembly 1006 is adapted to selectively allow air 104 to enter the interior chamber 1004 defined by the snorkel housing 1002 but not exit the interior chamber 1004 defined by the snorkel housing 1002. The air extraction snorkel assembly 122 further includes a bezel structure 1012 coupled to an exterior surface 1010a of the snorkel housing 1002 and disposed around the pressure relief valve assembly 1006, wherein the bezel structure 1012 is adapted to provide a smooth transition of local air flow through the pressure relief valve assembly 1006 and into the interior chamber 1004 defined by the snorkel housing 1002.

In this illustrative embodiment, the air extraction snorkel assembly 122 further includes an external gasket 1014 disposed around an opening 1016 formed in a lower portion 1018 of the snorkel housing 1002. The external gasket 1014 is adapted to sealingly engage a lower surface 430 (FIG. 4) of the side structure 118 (FIG. 1) of the vehicle 102 through which a corresponding opening 500 (FIG. 5) is formed, thereby allowing air to pass from the interior chamber 1004 defined by the snorkel housing 1002, through the opening 1016 formed in the lower portion 1018 of the snorkel housing 1002 and the corresponding opening 500 formed in the lower surface 430 of the side structure 118, and into an unsealed wheel well area 432 (FIG. 4) of the vehicle 102. This wheel well area 432 may itself be made water resistant by a wheel well liner 434 (FIG. 4) or the like disposed adjacent to the lower surface 430 of the side structure 118. Thus, in general, air from the interior chamber 1004 defined by the snorkel housing 1002 is vented to an environment surrounding the vehicle 102, initially below a wading line of the vehicle 102 in some cases. It will be readily apparent to those of ordinary skill in the art that the gasket 1014 need not be utilized, if, for example, the snorkel housing 1002 is integrally formed with or otherwise affixed to the lower surface 430 of the side structure 118.

Referring again specifically to FIG. 1, in one illustrative embodiment, the inlet port 116 defined by the interior structure 314 (FIG. 3) is hidden behind a speaker 302 (FIG. 3) or other grate or vent cover 130 disposed in or coupled to the interior structure 314 in the rear portion 132 of the vehicle 102, such as in the rear cargo and/or third-row seating area of the vehicle 102 for a sport utility or adventure vehicle or the like. This speaker configuration is described in greater detail herein below. Alternatively, the inlet port 116 defined by the interior structure 314 can be defined along a seam of the interior structure 314 or the like, such that it is unobtrusive and/or concealed from view to some extent. An advantage to disposing the inlet port 116 in the rear portion 132 of the vehicle 102 is that HVAC cabin air 104 typically flows from farther forward in the vehicle 102, where the driver and/or other occupants are typically seated.

Figure 2:
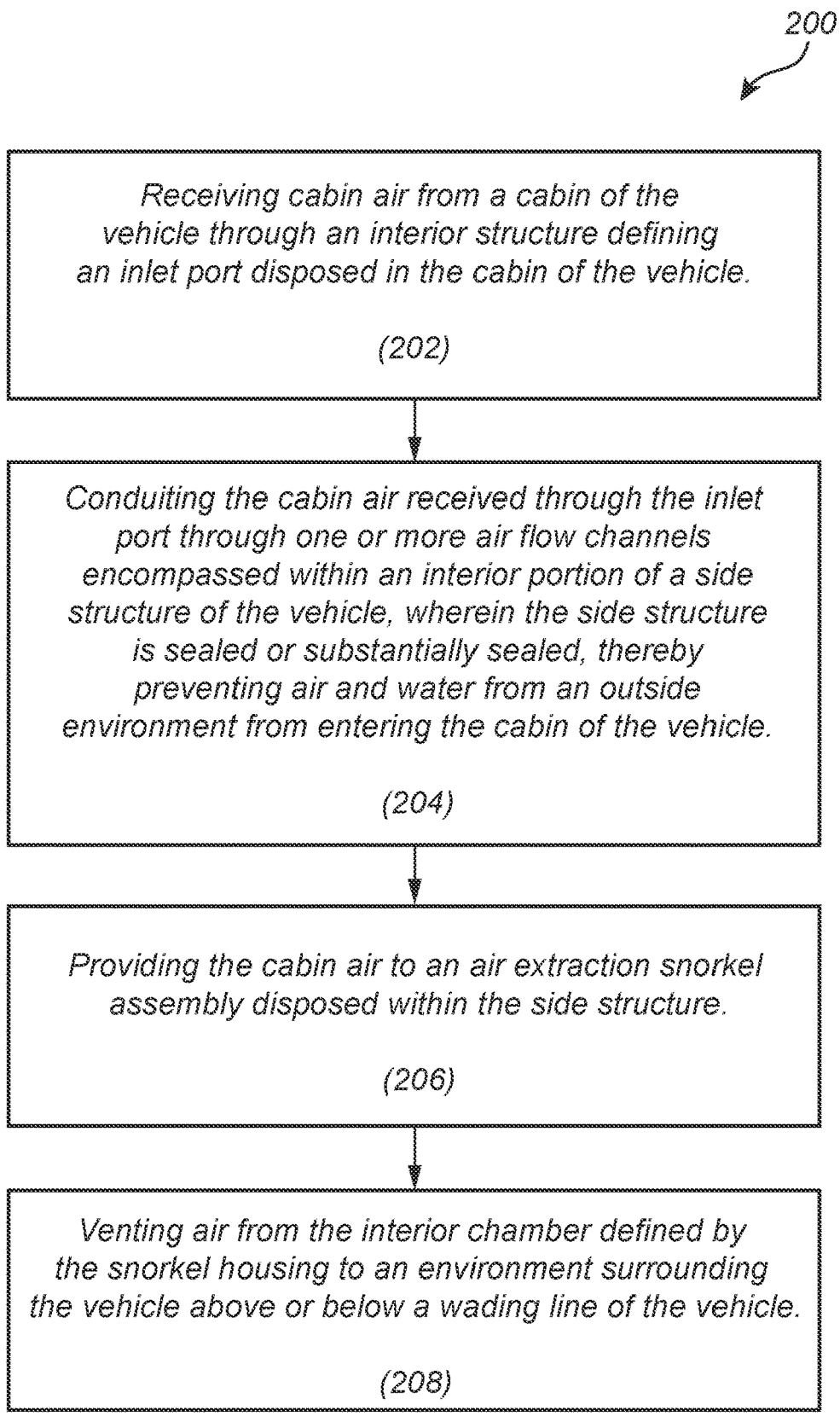
FIG. 2 is a flowchart providing the general steps in the cabin air extraction method of the present disclosure.

FIG. 2 is a flowchart providing the general steps in the cabin air extraction method 200 of the present disclosure. The air extraction method 200 includes first receiving cabin air from a cabin of the vehicle through an interior structure defining an inlet port disposed in the cabin of the vehicle (step 202). The air extraction method 200 then includes conduiting the cabin air received through the inlet port through one or more air flow channels encompassed within an interior portion of a side structure of the vehicle (step 204), wherein the side structure is sealed or substantially sealed, thereby preventing air and water from an outside environment from entering the cabin of the vehicle. The air extraction method 200 then includes providing the cabin air to an air extraction snorkel assembly disposed within the side structure (step 206). The air extraction snorkel assembly generally includes: a snorkel housing defining an interior chamber, wherein the snorkel housing is adapted to selectively contain the air conduited from the cabin of the vehicle and the inlet port of the interior structure; and a pressure relief valve disposed through a wall structure of the snorkel housing, wherein the pressure relief valve assembly is adapted to selectively allow air to enter the interior chamber defined by the snorkel housing but not exit the interior chamber defined by the snorkel housing. Finally, the air extraction method 200 generally includes venting air from the interior chamber defined by the snorkel housing to an environment surrounding the vehicle, initially below a wading line of the vehicle in some cases (step 208).

FIG. 3 is a perspective view illustrating one embodiment of the interior, inlet end 300 of the cabin air extraction assembly 100 (FIG. 1) of the present disclosure, utilizing a speaker assembly 302 to hide the associated interior inlet port 116. In this illustrative embodiment, the inlet port 116 defined by the interior structure 314 is hidden behind the speaker 302 or other grate or vent cover 130 disposed in or coupled to the interior structure 314 in the rear portion 132 of the vehicle 102 (FIG. 1), such as in the rear cargo and/or third-row seating area of the vehicle 102 for a sport utility or adventure vehicle or the like. For example, the speaker cone 302 may be separated from the exterior-side surface 502 (FIG. 5) of the interior panel 314 by a circumferential, partially circumferential, or discrete space 504 (FIG. 5) maintained between the speaker cone 302 (which may be a subwoofer speaker cone, for example) and the exterior-side surface 504 of the interior panel 314. This space 504 allows positive pressure cabin air from the HVAC system 112 (FIG. 1) or the like to pass around/behind the speaker cone 302 and into the side structure 118 (FIG. 1) of the vehicle, such that over-pressure in the cabin 106 is alleviated. Alternatively, the inlet port 116 defined by the interior structure 314 can be defined along a seam of the interior structure 314 or the like, such that it is unobtrusive and/or concealed from view to some extent. The advantage to disposing the inlet port 116 in the rear portion 132 of the vehicle 102 is that HVAC cabin air 104 typically flows from farther forward in the vehicle 102, where the driver and/or other occupants are typically seated.

Figure 4:
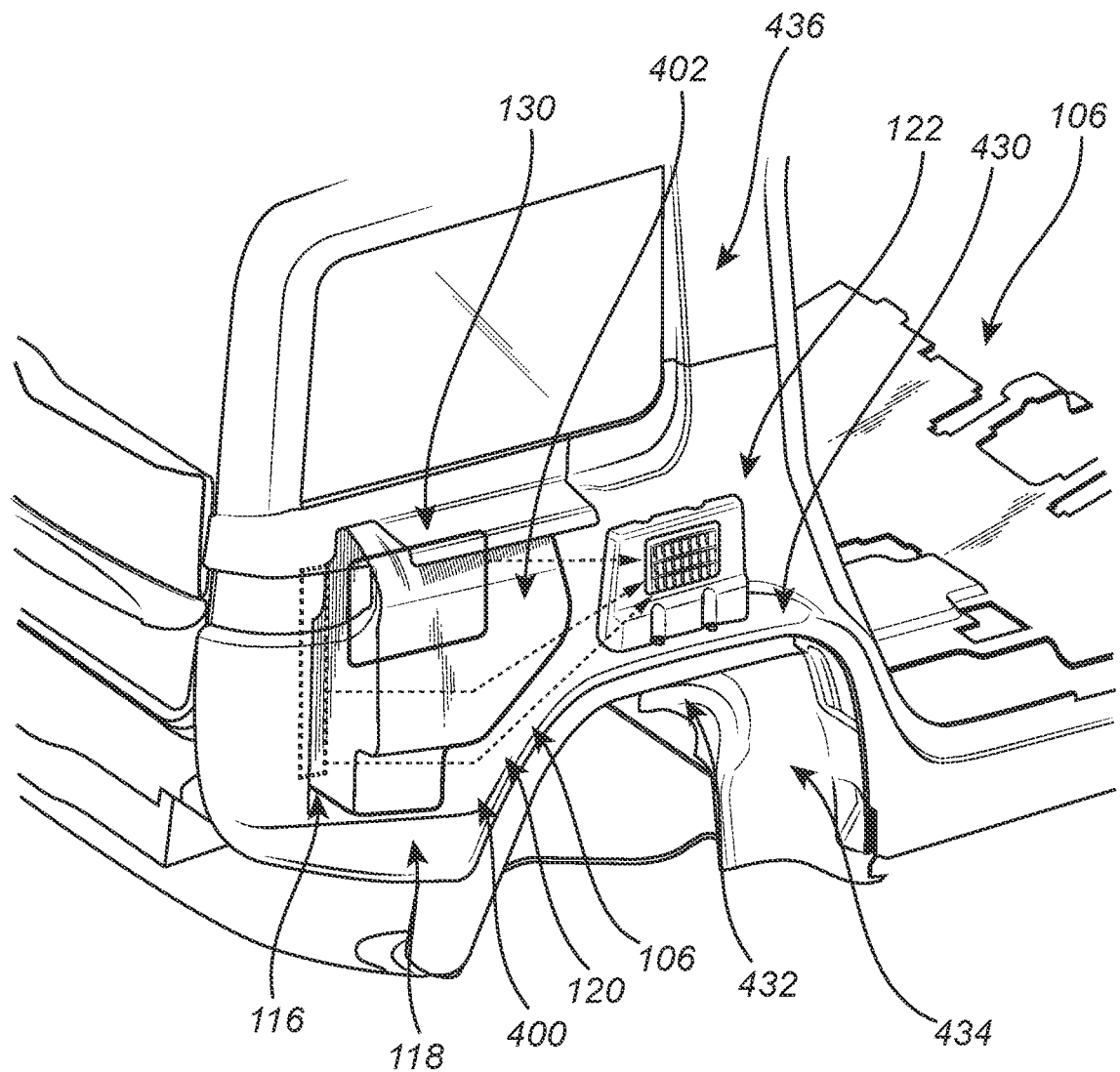
FIG. 4 is a perspective view illustrating one embodiment of the middle section of the cabin air extraction assembly of the present disclosure, conduiting extracted cabin air around a sound absorber structure utilized in conjunction with the associated speaker assembly.

FIG. 4 is a perspective view illustrating one embodiment of the middle section 400 of the cabin air extraction assembly 100 (FIG. 1) of the present disclosure, conduiting extracted cabin air 104 around a sound absorber structure 402 utilized in conjunction with the associated speaker assembly 302 (FIG. 3). Here, again, the interior structure 314 (FIG. 3) defining the inlet port 116 disposed in the cabin 106 of the vehicle 102 (FIG. 1) allows the cabin air 104 to pass to the side structure 118 (such as the exterior body panel or the like) that is sealed or substantially sealed, thereby preventing air and water from an outside environment from entering the cabin 106 of the vehicle 102. The interior portion of the side structure 118 (or interior side of the exterior body panel) encompasses or defines the one or more air flow channels 120 that are fluidly coupled to the inlet port 116 of the interior structure 314. The air extraction snorkel assembly 122 is disposed within the side structure 118 and is fluidly coupled with the one or more air flow channels 120 encompassed within the side structure 118. Thus, the one or more air flow channels 120 encompassed within the side structure 118 are adapted to conduit air 104 from the cabin 106 of the vehicle 102 and the inlet port 116 of the interior structure 314 to the air extraction snorkel assembly 122. Here, the air is conduited, in part, around the sound absorber structure 402.

The air extraction snorkel assembly 122 generally includes the snorkel housing 1002 (FIG. 10) defining the interior chamber 1004 (FIG. 10) that is adapted to selectively contain the air 104 conduited from the cabin 106 of the vehicle 102 and the inlet port 116 of the interior structure 314. The air extraction snorkel assembly 122 further includes the pressure relief valve assembly 1006 (FIG. 10) disposed through the opening 1008 (FIG. 10) in the wall structure 1010 (FIG. 10), such as a side wall structure or the like, of the snorkel housing 1002. The pressure relief valve assembly 1006 is adapted to selectively allow the air 104 to enter the interior chamber 1004 defined by the snorkel housing 1002 but not exit the interior chamber 1004 defined by the snorkel housing 1002.

The air extraction snorkel assembly 122 further includes the external gasket 1014 (FIG. 10) disposed around the opening 1016 (FIG. 10) formed in a lower portion 1018 (FIG. 10) of the snorkel housing 1002. The external gasket 1014 is adapted to sealingly engage the lower surface 430 of the side structure 118 of the vehicle 102 through which the corresponding opening 500 (FIG. 5) is formed, thereby allowing air to pass from the interior chamber 1004 defined by the snorkel housing 1002, through the opening 1016 formed in the lower portion 1018 of the snorkel housing 1002 and the corresponding opening 500 formed in the lower surface 430 of the side structure 118, and into an unsealed wheel well area 432 of the vehicle 102. This wheel well area 432 may itself be made water resistant by a wheel well liner 434 or the like disposed adjacent to the lower surface 430 of the side structure 118 Thus, in general, air from the interior chamber 1004 defined by the snorkel housing 1002 is vented to the environment surrounding the vehicle 102, initially below a wading line of the vehicle 102 in some cases.

Figure 5:
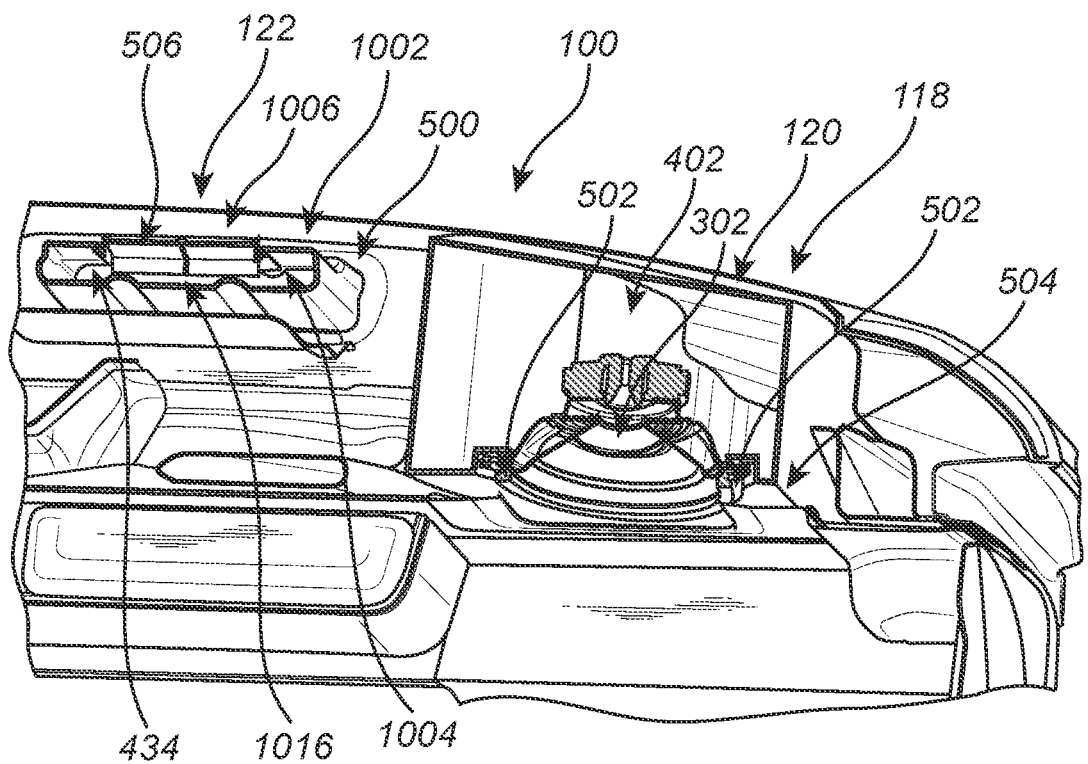
FIG. 5 is another perspective view illustrating one embodiment of the cabin air extraction assembly of the present disclosure, utilizing a speaker assembly and associated speaker grill to hide the associated interior inlet port and a sound absorber structure and adjacent exterior body panel to form one or more air flow channels, at least in part.

FIG. 5 is another perspective view illustrating one embodiment of the cabin air extraction assembly 100 of the present disclosure, utilizing the speaker assembly 302 to hide the associated interior inlet port 116 (FIG. 1) and the sound absorber structure 402 and adjacent exterior body panel 118 to form one or more air flow channels 120, at least in part. In this illustrative embodiment, the cabin air 104 (FIG. 1) flows from the spaces 502 formed around the speaker assembly 302, into the cavity provided behind the exterior body panel 118 and around the sound absorber structure 402. The cabin air 104 is conduited to the snorkel assembly 122, in part, through a gap 120 formed between the exterior of the sound absorber structure 402 and the interior surface of the exterior body panel 118. The cabin air 104 may also pass in front of, behind, over, and/or under the sound absorber structure 402, provided it is ultimately able to reach the snorkel assembly 122.

In this illustrative embodiment, the snorkel housing 1002 of the snorkel assembly 122 is disposed through the opening 500 in the lower surface 430 of the side structure 118, from the bottom, with the gasket 1014 (FIG. 10) disposed between a flange of the snorkel assembly 122 and the lower surface 430 of the side structure 188. The pressure relief valve assembly 1006, disposed within the side structure 118, comprises a plurality of rotating or flexing door or flaps or the like designed to allow cabin air 104 (FIG. 1) now present in the side structure 118 to pass into the internal chamber 1004 of the snorkel housing 1002 when a predetermined pressure is reached. It will be readily apparent to the of ordinary skill in the art that any appropriate one-way valve or the like may be used for this purpose. In this illustrative embodiment, the opening 500 formed in the lower surface 430 of the side structure 118, and the opening 1016 formed in the snorkel housing 1002, are covered by the wheel well liner 434 or the like, such that water, air, and/or debris cannot readily enter the snorkel housing 1002 through this channel. This wheel well liner 434 is not otherwise environmentally sealed, such that air from the internal chamber 1004 of the snorkel housing 1002 can be vented to the outside environment.

Figure 6:
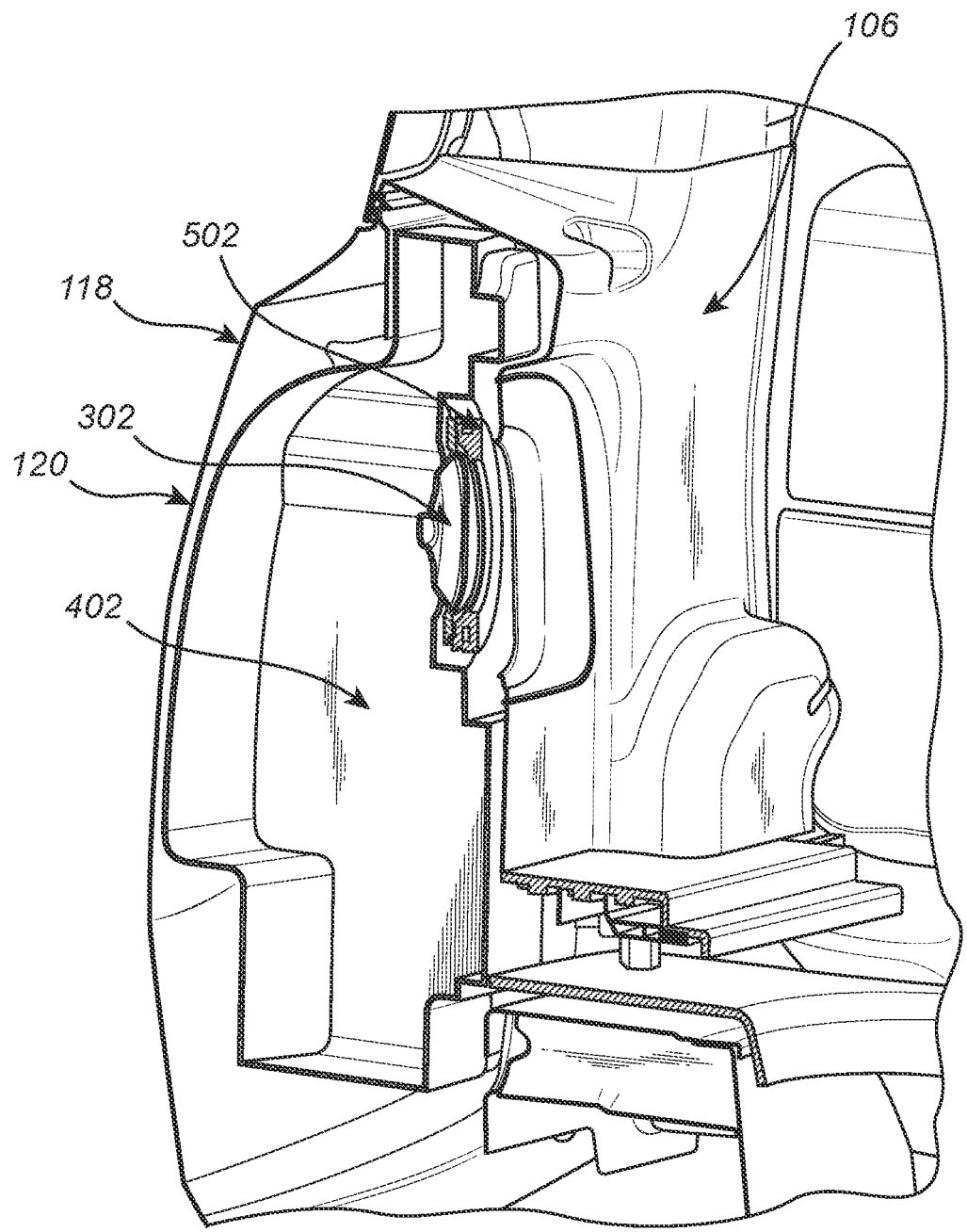
FIG. 6 is a further perspective view illustrating one embodiment of the cabin air extraction assembly of the present disclosure, utilizing a speaker assembly and associated speaker grill to hide the associated interior inlet port and a sound absorber structure and adjacent exterior body panel to form one or more air flow channels, at least in part.

FIG. 6 is a further perspective view illustrating one embodiment of the cabin air extraction assembly 100 (FIG. 1) of the present disclosure, utilizing the speaker assembly 302 to hide the associated interior inlet port 116 (FIG. 1) and the sound absorber structure 402 and adjacent exterior body panel 118 to form one or more air flow channels 120, at least in part. In this illustrative embodiment, the cabin air 104 (FIG. 1) flows from the spaces 502 formed around the speaker assembly 302, into the cavity provided behind the exterior body panel 118 and around the sound absorber structure 402. The cabin air 104 is conduited to the snorkel assembly 122 (FIG. 1), in part, through a gap 120 formed between the exterior of the sound absorber structure 402 and the interior surface of the exterior body panel 118. The cabin air 104 may also pass in front of, behind, over, and/or under the sound absorber structure 402, provided it is ultimately able to reach the snorkel assembly 122 (FIG. 1). Here, the interior panel 106 is also shown.

Figure 7:
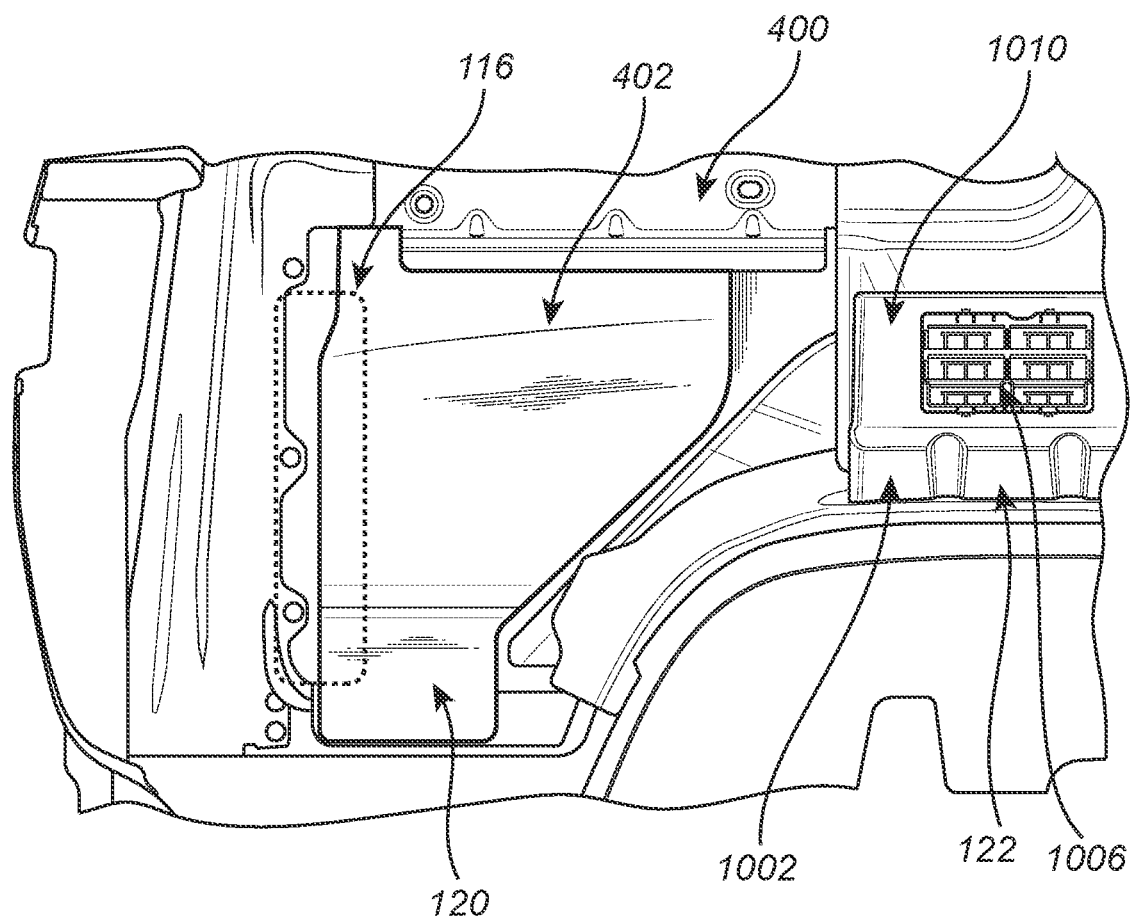
FIG. 7 is another perspective view illustrating one embodiment of the middle section of the cabin air extraction assembly of the present disclosure, conduiting extracted cabin air around a sound absorber structure utilized in conjunction with the associated speaker assembly.

FIG. 7 is another perspective view illustrating one embodiment of the middle section 400 of the cabin air extraction assembly 100 (FIG. 1) of the present disclosure, conduiting extracted cabin air 104 (FIG. 1) around a sound absorber structure 402 utilized in conjunction with the associated speaker assembly 302 (FIG. 3). Here, again, the interior structure 314 (FIG. 3) defining the inlet port 116 disposed in the cabin 106 (FIG. 1) of the vehicle 102 (FIG. 1) allows the cabin air 104 to pass to the side structure 118 (FIG. 1) (such as the exterior body panel or the like) that is sealed or substantially sealed, thereby preventing air and water from an outside environment from entering the cabin 106 of the vehicle 102. The interior portion of the side structure 118 (or interior side of the exterior body panel) encompasses or defines the one or more air flow channels 120 that are fluidly coupled to the inlet port 116 of the interior structure 314. The air extraction snorkel assembly 122 is disposed within the side structure 118 and is fluidly coupled with the one or more air flow channels 120 encompassed within the side structure 118. Thus, the one or more air flow channels 120 encompassed within the side structure 118 are adapted to conduit air 104 from the cabin 106 of the vehicle 102 and the inlet port 116 of the interior structure 314 to the air extraction snorkel assembly 122. Here, the air is conduited, in part, around the sound absorber structure 402.

The air extraction snorkel assembly 122 generally includes the snorkel housing 1002 defining the interior chamber 1004 (FIG. 10) that is adapted to selectively contain the air 104 conduited from the cabin 106 of the vehicle 102 and the inlet port 116 of the interior structure 314. The air extraction snorkel assembly 122 further includes the pressure relief valve assembly 1006 disposed through the opening 1008 (FIG. 10) in the wall structure 1010, such as a side wall structure or the like, of the snorkel housing 1002. The pressure relief valve assembly 1006 is adapted to selectively allow the air 104 to enter the interior chamber 1004 defined by the snorkel housing 1002 but not exit the interior chamber 1004 defined by the snorkel housing 1002.

Figure 8:
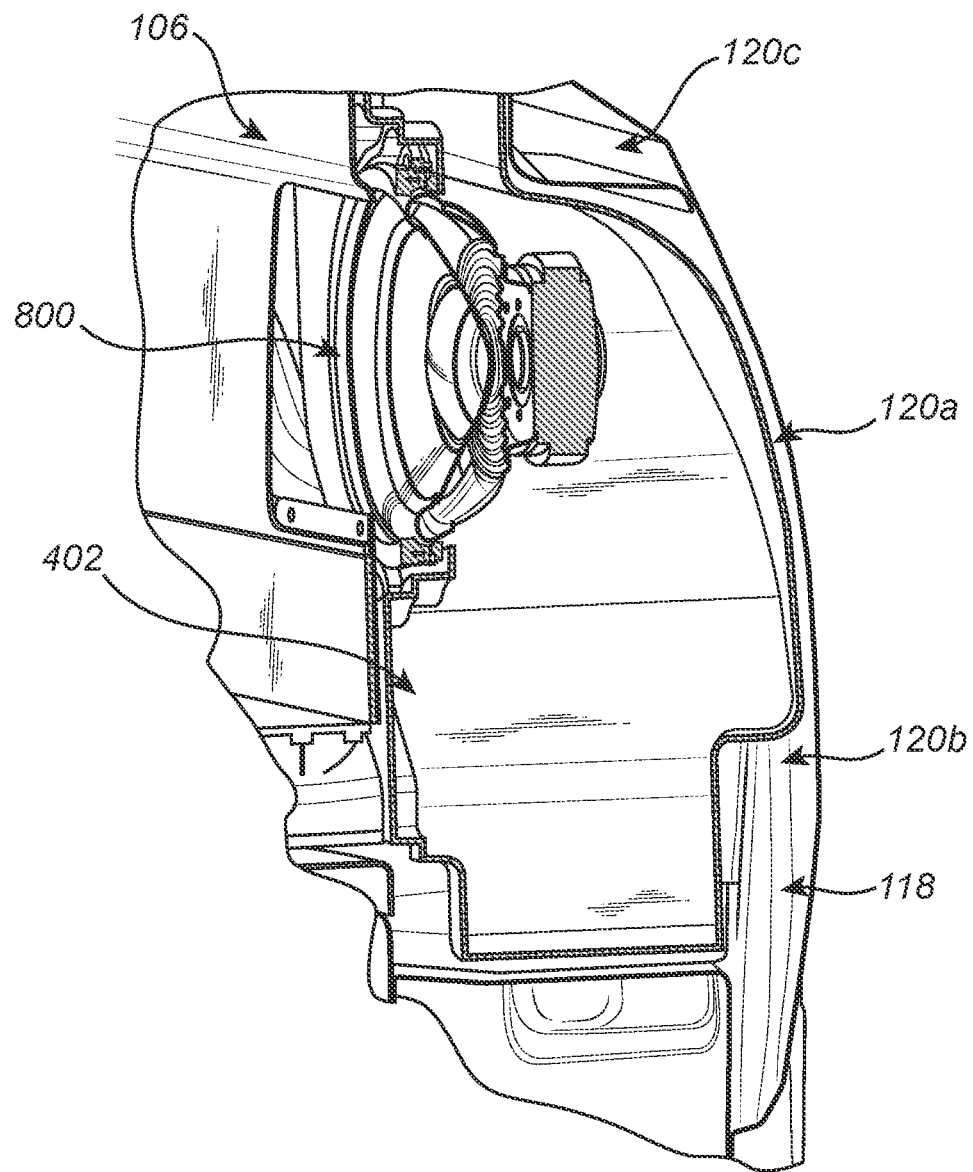
FIG. 8 is a further perspective view illustrating one embodiment of the cabin air extraction assembly of the present disclosure, utilizing a speaker assembly and associated speaker grill to hide the associated interior inlet port and a sound absorber structure and adjacent exterior body panel to form one or more air flow channels, at least in part.

FIG. 8 illustrates various potential air flow channels 120*a*, 120*b*, and 120*c* from the opening 800 in the interior panel 106 and around the sound absorber structure 402 behind the exterior panel 118. It will be readily apparent to those of ordinary skill in the art that other air flow channels could be used as well.

Figure 9:
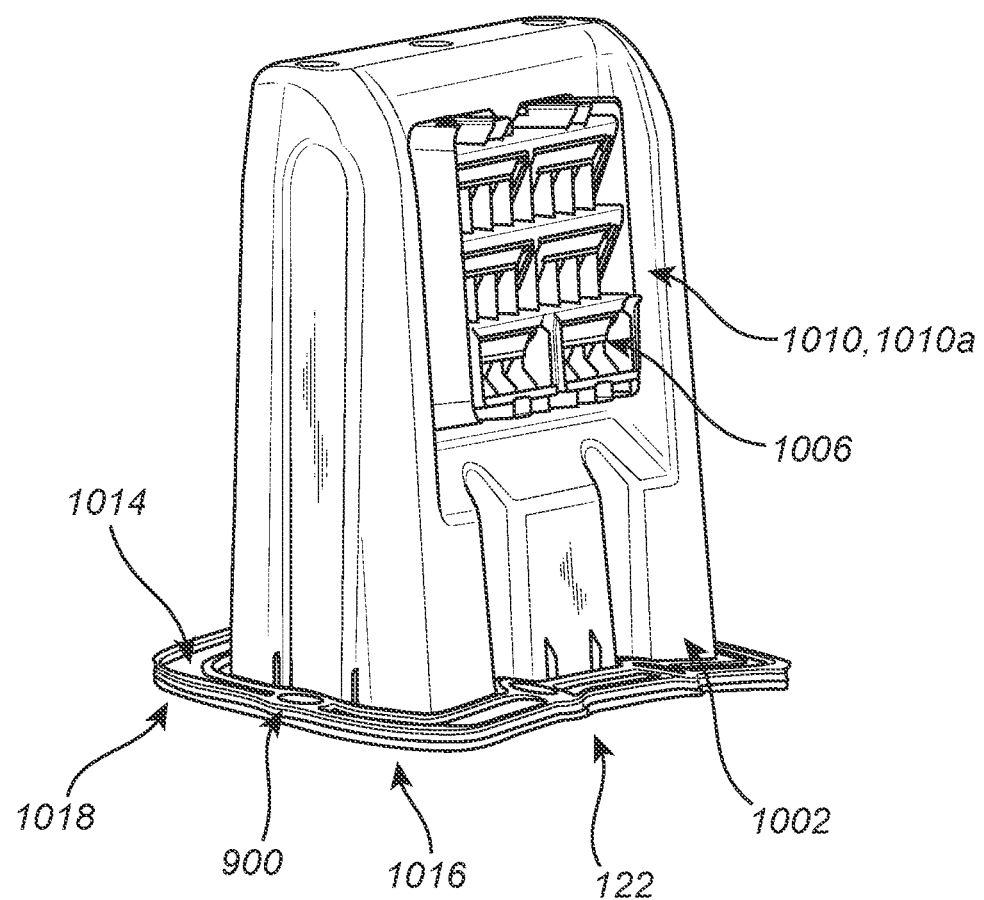
FIG. 9 is a perspective view of one illustrative embodiment of the snorkel assembly of the present disclosure.

FIG. 9 is another perspective view of one illustrative embodiment of the snorkel assembly 122 of the present disclosure. The air extraction snorkel assembly 122 generally includes the snorkel housing 1002 defining the interior chamber 1004 (FIG. 10) that is adapted to selectively contain the air 104 (FIG. 1) conduited from the cabin 106 (FIG. 1) of the vehicle 102 (FIG. 1) and the inlet port 116 (FIG. 1) of the interior structure 314 (FIG. 3). The air extraction snorkel assembly 122 further includes the pressure relief valve assembly 1006 disposed through the opening 1008 in the wall structure 1010, such as a side wall structure or the like, of the snorkel housing 1002. The pressure relief valve assembly 1006 is adapted to selectively allow air 104 to enter the interior chamber 1004 defined by the snorkel housing 1002 but not exit the interior chamber 1004 defined by the snorkel housing 1002. The air extraction snorkel assembly 122 further includes a bezel structure 1012 (FIG. 10) coupled to an exterior surface 1010a of the snorkel housing 1002 and disposed around the pressure relief valve assembly 1006, wherein the bezel structure 1012 is adapted to provide a smooth transition of local air flow through the pressure relief valve assembly 1006 and into the interior chamber 1004 defined by the snorkel housing 1002.

In this illustrative embodiment, the air extraction snorkel assembly 122 further includes the external gasket 1014 disposed around the opening 1016 formed in the lower portion 1018 of the snorkel housing 1002. The external gasket 1014 is adapted to sealingly engage the lower surface 430 (FIG. 4) of the side structure 118 (FIG. 1) of the vehicle 102 through which the corresponding opening 500 (FIG. 5) is formed, thereby allowing air to pass from the interior chamber 1004 defined by the snorkel housing 1002, through the opening 1016 formed in the lower portion 1018 of the snorkel housing 1002 and the corresponding opening 500 formed in the lower surface 430 of the side structure 118, and into the unsealed wheel well area 432 (FIG. 4) of the vehicle 102. The external gasket 1014 may be integrally formed with the lower portion 1018 of the snorkel housing 1002, or it may be a separate component disposed between the lower portion 1018 of the snorkel housing 1002 and the lower surface 430 of the side structure 118. The wheel well area 432 may itself be made water resistant by the wheel well liner 434 (FIG. 4) or the like disposed adjacent to the lower surface 430 of the side structure 118. Thus, in general, air from the interior chamber 1004 defined by the snorkel housing 1002 is vented to the environment surrounding the vehicle 102, initially below the wading line of the vehicle 102 in some cases. As illustrated, the snorkel housing 1002 is bolted or otherwise affixed to the vehicle structures via a plurality of holes 900 manufactured into the flange 1018 of the snorkel housing 1002.

Figure 11:
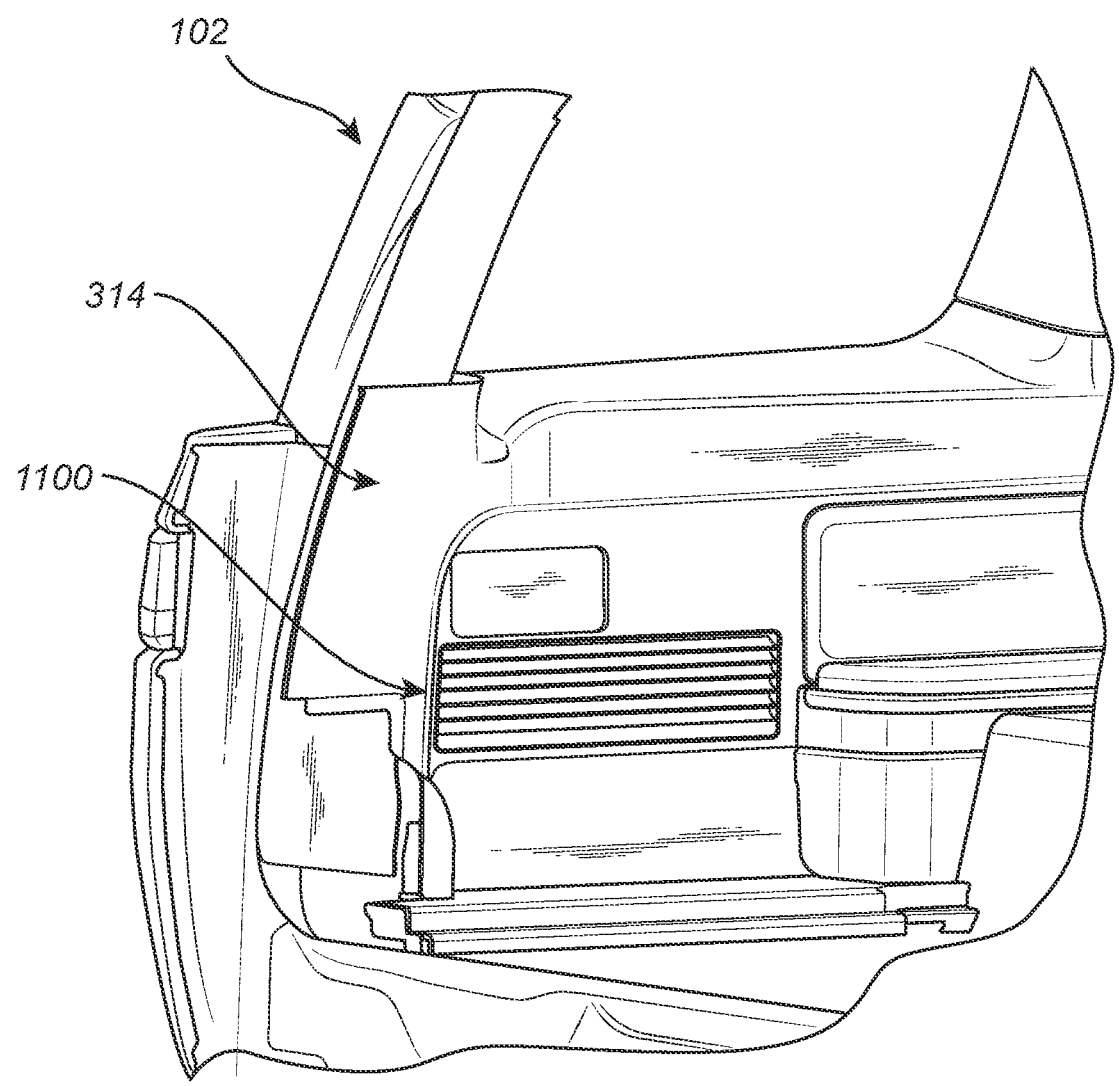
FIG. 11 is a perspective view illustrating another embodiment of the interior, inlet end of the cabin air extraction assembly of the present disclosure, utilizing an alternative vent cover to hide the associated interior inlet port.

It will readily apparent to those of ordinary skill in the art that the assemblies and methods of the present disclosure can be implemented in either or both sides of a vehicle, in any desired location within the vehicle interior. For example, FIG. 11 is a perspective view illustrating another embodiment of the interior, inlet end of the cabin air extraction assembly of the present disclosure, utilizing an alternative vent cover 1100 disposed in the interior panel 314 of the vehicle 102 to hide the associated interior inlet port. This vent cover 1100 may be disposed in either side of the rear (or other) portion of the vehicle 102 and may be utilized in conjunction with an auxiliary HVAC system or the like, or may simply be a dummy vent cover for use by the air extraction system of the present disclosure alone.

Figure 12:
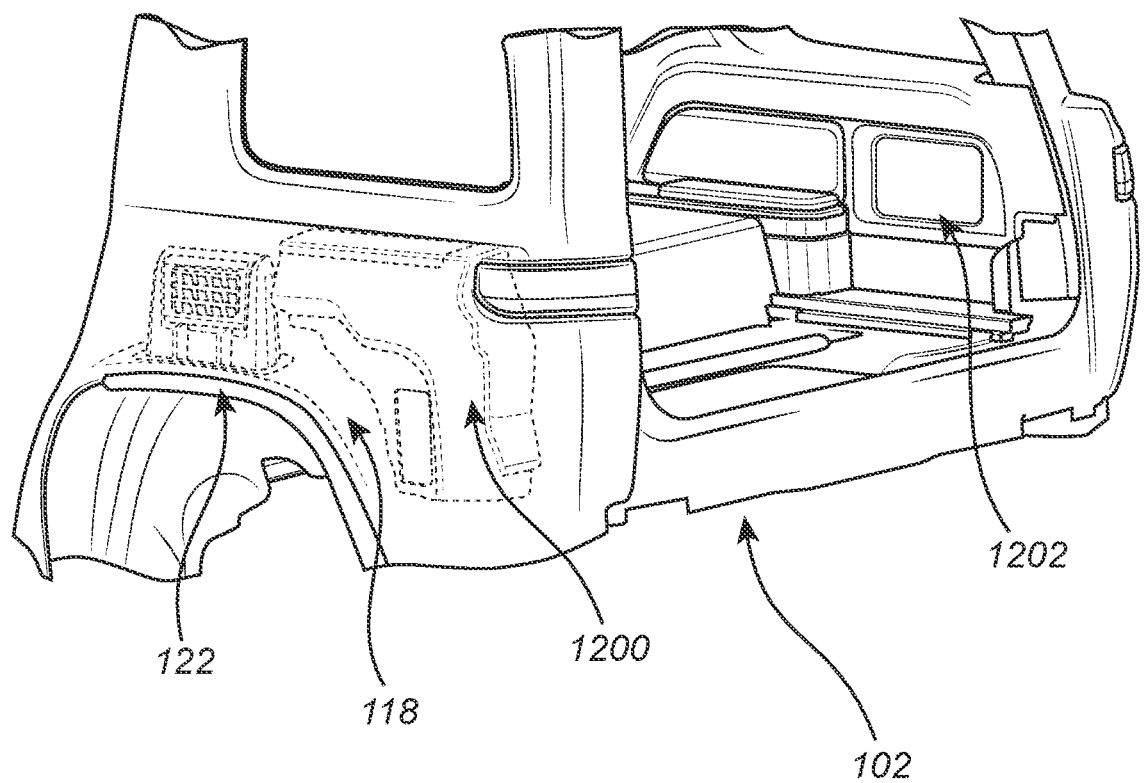
FIG. 12 a perspective view illustrating another embodiment of the middle section of the cabin air extraction assembly of the present disclosure, conduiting extracted cabin air around an auxiliary HVAC unit or the like disposed in a rear portion of the vehicle.
Figure 13:
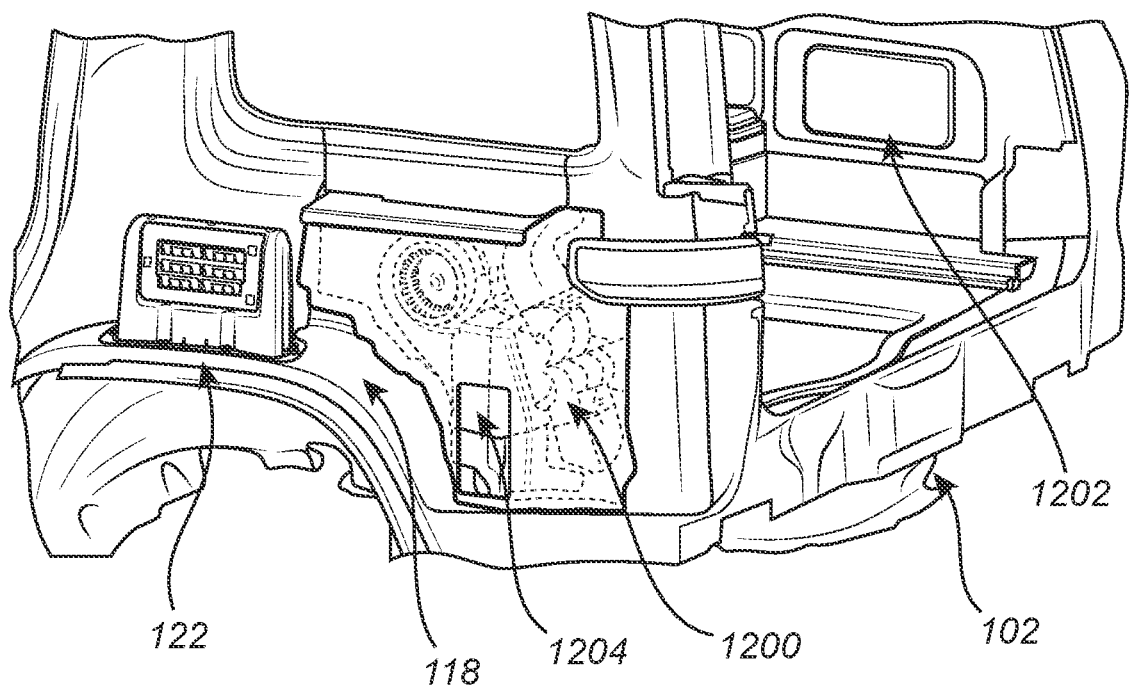
FIG. 13 is another perspective view illustrating another embodiment of the middle section of the cabin air extraction assembly of the present disclosure, conduiting extracted cabin air around the auxiliary HVAC unit or the like disposed in the rear portion of the vehicle.

FIGS. 12 and 13 are perspective views illustrating another embodiment of the middle section of the cabin air extraction assembly of the present disclosure, conduiting extracted cabin air around an auxiliary HVAC unit 1204 and outside auxiliary HVAC unit cover panel 1200 or the like disposed in the rear portion of the vehicle 102 within the side structure 118. The snorkel housing 122 is disposed in the same illustrative relative position as previously. Also shown here is the speaker assembly grill 1202 utilized as an air extraction inlet in prior embodiments.

Figure 14:
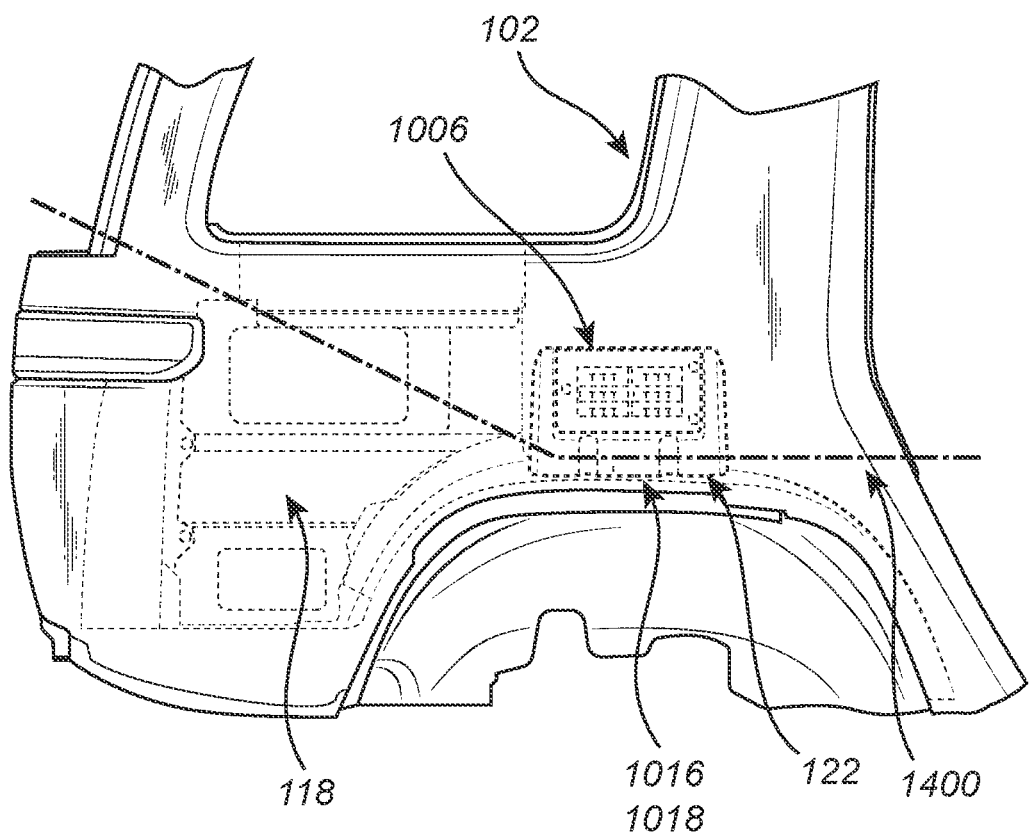
FIG. 14 is a schematic diagram illustrating a possible placement of the parts of the snorkel assembly of the present disclosure in a relation to a wading line of the vehicle.

FIG. 14 is a schematic diagram illustrating a possible placement of the parts of the snorkel assembly 122 of the present disclosure in a relation to a wading line 1400 of the vehicle 102. Here, it can be seen that the lower portion 1018 and bottom opening 1016 of the snorkel assembly 122 disposed within the side structure 118 of the vehicle 102 are disposed below the wading line 1400, while the pressure relief valve 1006 is disposed above the wading line 1400. Given this configuration, cabin air may be conduited into the snorkel assembly 122 through the side structure 118 and pressure relief valve 1006 and then exhausted to the surrounding water and environment through the bottom opening 1016 of the snorkel assembly 122.

In some instances, one or more components may be referred to herein as "configured to," "configured by," "configurable to," "operable/operative to," "adapted/adaptable," "able to," "conformable/conformed to," etc. Those of ordinary skill in the art will recognize that such terms (for example "configured to") generally encompass active-state components and/or inactive-state components and/or standby-state components, unless context requires otherwise.

While particular aspects of the present disclosure described herein have been shown and described, it will be apparent to those of ordinary skill in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those of ordinary skill in the art that, in general, terms used herein, and especially in the appended claims (for example, the bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those of ordinary skill in the art that if a specific number of an introduced claim recitation is intended, such an intent will be explicitly recited in the claim, and, in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those of ordinary skill in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general, such a construction is intended in the sense that those of ordinary skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An air extraction snorkel assembly for a vehicle, the air extraction snorkel assembly comprising:
a snorkel housing defining an interior chamber and the snorkel housing disposed within a side structure of the vehicle;
the snorkel housing configured to selectively contain, via the interior chamber, air conduited, through one or more air flow channels encompassed within the side structure, from the cabin of the vehicle to the snorkel housing disposed within the side structure;
a valve assembly disposed through an opening of a wall structure of the snorkel housing;
the valve assembly configured to;
selectively allow the air conduited, through the one or more air flow channels, from the cabin of the vehicle to enter the interior chamber; and
prevent the air conduited from the cabin of the vehicle from exiting the interior chamber via the opening of the wall structure; and
an external gasket configured to engage a surface of the side structure to form an opening of the side structure;
the opening of the side structure configured to allow the air conduited from the cabin of the vehicle to exit the interior chamber via an area of the vehicle located over a wheel well of the vehicle.

2. The air extraction snorkel assembly of claim 1, further comprising a bezel structure coupled to an exterior surface of the snorkel housing and disposed around the valve assembly, wherein the bezel structure is adapted to smooth a transition of local air flow into the valve assembly and the interior chamber defined by the snorkel housing.

3. The air extraction snorkel assembly of claim 1, wherein the valve assembly is adapted to be disposed within the side structure of the vehicle above a wading line of the vehicle.

4. The air extraction snorkel assembly of claim 3, wherein a bottom portion of the snorkel housing is adapted to be disposed within the side structure of the vehicle below the wading line of the vehicle.

5. The air extraction snorkel assembly of claim 1, wherein the snorkel housing disposed within the side structure of the vehicle, the valve assembly disposed through the wall structure of the snorkel housing, and the one or more air flow channels encompassed within the side structure are disposed between an exterior body panel of the vehicle and an interior structure of the vehicle.

6. An air extraction system for a vehicle, the air extraction system comprising:
an interior structure defining an inlet port disposed in a cabin of the vehicle;
a side structure, wherein an interior portion of the side structure encompasses one or more air flow channels; and
an air extraction snorkel assembly including:
a snorkel housing defining an interior chamber and the snorkel housing disposed within the side structure of the vehicle;
the snorkel housing configured to selectively contain, via the interior chamber, air conduited, through the one or more air flow channels, from the cabin of the vehicle to the snorkel housing;
a valve assembly disposed through an opening of a wall structure of the snorkel housing;
the valve assembly configured to:
selectively allow the air conduited from the cabin of the vehicle to enter the interior chamber; and
prevent the air conduited from the cabin of the vehicle from exiting the interior chamber via the opening of the wall structure; and
an external gasket configured to engage a surface of the side structure to form an opening of the side structure;
the opening of the side structure configured to allow the air conduited from the cabin of the vehicle to exit the interior chamber via an area of the vehicle located over a wheel well of the vehicle.

7. The air extraction system of claim 6, wherein the air extraction snorkel assembly further comprises a bezel structure coupled to an exterior surface of the snorkel housing and disposed around the valve assembly, wherein the bezel structure is adapted to smooth a transition of local air flow into the valve assembly and the interior chamber defined by the snorkel housing.

8. The air extraction system of claim 6, wherein the valve assembly is disposed within the side structure above a wading line of the vehicle.

9. The air extraction system of claim 8, wherein a bottom portion of the snorkel housing defining an opening to an environment surrounding the vehicle is disposed within the side structure below the wading line of the vehicle.

10. The air extraction system of claim 6, wherein the inlet port defined by the interior structure is disposed adjacent to a speaker assembly of the vehicle.

11. The air extraction system of claim 10, wherein the one or more air flow channels encompassed within the side structure are adapted to conduit air from the cabin of the vehicle around a sound absorber structure disposed between the interior structure and the side structure adjacent to the speaker assembly of the vehicle.

12. The air extraction system of claim 6, wherein the interior structure and the side structure are disposed at a rear portion of the vehicle.

13. An air extraction method for use in a vehicle, the air extraction method comprising:
receiving cabin air from a cabin of the vehicle through an interior structure defining an inlet port disposed in the cabin of the vehicle;

conduiting the cabin air received through the inlet port through one or more air flow channels encompassed within an interior portion of a side structure of the vehicle;

containing, by a snorkel housing of an air extraction snorkel assembly, via an interior chamber of the snorkel housing, the cabin air conduited from the cabin of the vehicle;

selectively allowing, by a valve assembly of the air extraction snorkel assembly, the cabin air to enter the interior chamber;

preventing, by the valve assembly, the cabin air from exiting the interior chamber via an opening of a wall structure of the snorkel housing; and forming, responsive to engaging an external gasket of the air extraction snorkel assembly, an opening to allow the cabin air to exit the interior chamber via an area of the vehicle located over a wheel well of the vehicle.

14. The air extraction method of claim 13, wherein the inlet port defined by the interior structure is disposed adjacent to a speaker assembly of the vehicle.

15. The air extraction method of claim 14, wherein the one or more air flow channels encompassed within the side structure are adapted to conduit air around a sound absorber structure disposed between the interior structure and the side structure adjacent to the speaker assembly of the vehicle.

16. The air extraction method of claim 13, wherein the valve assembly is disposed within the side structure above a wading line of the vehicle.

* * * * *